United States Patent

[11] 3,602,100

| [72] | Inventor | Karl Eickman<br>2420 Isshiki, Hayama-machi, Kanagawa-ken, Japan |
|------|----------|---|
| [21] | Appl. No. | 830,298 |
| [22] | Filed | June 4, 1969 |
| [45] | Patented | Aug. 31, 1971 |
| [32] | Priority | June 7, 1968 |
| [33] | | Great Britain |
| [31] | | 27113/68 |

[54] SEALING ARRANGEMENT FOR A RADIALLY MOVABLE PORT MEMBER
8 Claims, 1 Drawing Fig.

[52] U.S. Cl. .................................................. 91/418, 277/174
[51] Int. Cl. ............................................... F15b 11/08
[50] Field of Search .......................................... 103/121, 130, 161; 277/174, 177

[56] References Cited
UNITED STATES PATENTS

| 2,772,755 | 12/1956 | Nallinger et al. | 103/161 |
| 3,062,151 | 11/1962 | Eickmann | 103/161 |
| 3,118,388 | 1/1964 | Eriksson | 103/161 |
| 3,211,105 | 10/1965 | Bush et al. | 103/161 |
| 3,259,392 | 7/1966 | Peickii et al. | 277/177 |
| 3,273,511 | 9/1966 | Eickmann | 103/161 |
| 3,312,175 | 4/1967 | Schmitz | 103/121 |
| 3,348,849 | 10/1967 | Newcomb et al. | 277/174 |

*Primary Examiner* — C. J. Husar
*Attorney* — Michael S. Striker

ABSTRACT: A radially movable port member is located in a housing spaced from its inner surface, and carries a ring between each two ports. During radial or angular movement of the port member, the rings move radially in annular grooves of the housing while lateral faces thereof slide in sealing contact on lateral faces of the respective grooves so that a sealed chamber is formed for each port.

PATENTED AUG 31 1971
3,602,100
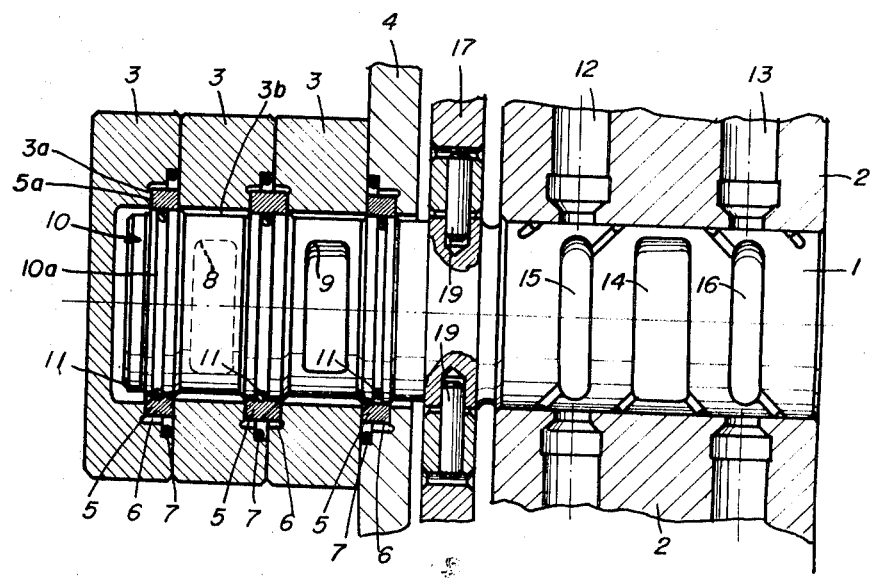
INVENTOR.
KARL EICKMANN
BY

SEALING ARRANGEMENT FOR A RADIALLY MOVABLE PORT MEMBER

CROSS-REFERENCE TO RELATED PATENTS

The present invention is closely related to other inventions described in my British Pat. No. 939,088 and 909,089, in my U.S. Pat. No. 3,062,151, in my Australian Pat. No. 250,528, in my German Pat. No. 1,132,519, and in my Japanese Pat. No. 319,034.

BACKGROUND OF THE INVENTION

In the above-enumerated patents, the problem arises to seal a floating control body having a portion with ports, and in accordance with my previous patents, this problem was solved in a manner which was not entirely satisfactory since the friction of sealing rings exerted a tilting movement on the floating control body restricting the floating movement of the same. Furthermore, the respective sealing devices were difficult to assemble and expensive to manufacture.

SUMMARY OF THE INVENTION

It is the object of the present invention to overcome the disadvantages of the prior art for sealing a floating control body, and to provide efficient sealing means for the same which are of simple construction, and do not restrict the floating movements of the control body in any manner.

A preferred embodiment of the invention comprises a cylindrical port member having axially spaced ports and being mounted at least for radial movement within predetermined limits; housing means enveloping the port member and having an inner surface radially spaced from the outer surface of the cylindrical port member, said inner surface having a plurality of annular grooves having a predetermined radial depth and being axially spaced and disposed so that each port is located between two annular grooves, each groove being laterally bounded by a pair of radially extending lateral annular groove faces; and a ring means located in each annular groove carried by the port member and having an inner annular face in sealing contact with the outer surface of the same, and a pair of radially extending lateral annular ring faces in sliding and sealing engagement with at least one of the lateral annular groove faces of the respective annular groove. Each sealing means has an outer annular peripheral face spaced from the bottom of the respective annular groove. The ring means radially move in the annular grooves, respectively, when radially moved by the port member, and due to the sealing engagement between the inner annular face of each ring and the outer peripheral face of the port member on the one hand, and due to the sealing engagement between the lateral faces of each ring and corresponding face on the housing, any two ring means between which any port is located, form a sealed chamber in the housing for the respective port. The novel features which are considered as characteristic for the invention are set forth in particular in the appended claims. The invention itself, however, both as to its construction and its method or operation, together with additional objects and advantages thereof, will be best understood from the following description of specific embodiments when read in connection with the accompanying drawing.

The single FIGURE of the drawing is an axial sectional view illustrating an embodiment of the invention

DESCRIPTION OF THE PREFERRED EMBODIMENT

A rotor 2 is mounted in a casing 17 for rotation about its axis. Rotor 2 has working chambers 12 and 13 opening into an inner central bore of rotor 2 in which a control body 1, provided with at least a pair of control ports 15 and 16 is located. Fluid is supplied from the control ports 15, 16, to the working chambers 12 and 13, during rotation of rotor 2. Control body 1 may have a fluid-containing pressure balancing recess 14.

Control body 1 has a cylindrical peripheral stationary control face which is slidingly engaged by a corresponding cylindrical inner face of rotor 2. The control faces slide on each other in sealing engagement to prevent loss of fluid due to leadage from the control ports.

Control body 1 fits tightly into bore of rotor 2.

Control body 1 is mounted in a cardanic suspension 17 so that it can perform limited movement movement in radial direction and also transverse angular movements which may be called "spherical." Radially extending pins 19 connect the suspension 17 with control body 1, and permit axial and angular movement of the same.

Control body 1 has an end portion 10 which projects out of rotor 2, and will be hereinafter referred to as "port portion" 10, since this portion has ports 8 and 9.

Port portion 10 is located in the housing means 3 which consists of abutting annular parts and an end part. Between the cylindrical outer periphery of port portion 10 and the inner surface of the housing means 3, there is an annular gap 3b which permits radial movement of port portion 10 to a limited extent without engagement with the inner surface of housing 3. This gap 3a would establish communication between the ports 8 and 9. Therefore, sealing means must be provided on opposite sides of each port 8 and 9, but conventional sealing means would not permit the radial movement of port portion 10 required for the floating control body 1.

In accordance with the invention, annular grooves 6 are provided in the inner cylindrical surface of the housing. As shown for the end housing part, the groove 6 is located entirely in the same and bounded laterally on one side by lateral face of the next adjacent housing portion 3. As shown for the next following groove 6, the same is partly located in each of two adjacent housing portions 3.

A ring means 5 having radially extending annular lateral faces 5a, is located in each groove 6. Each ring means 5 has an inner cylindrical face which surrounds a corresponding outwardly projecting portion with an outer peripheral narrow face 10a. Each surface 10a is preferably formed with an annular recess in which a sealing ring 11 is located engaged by the inner annular surface of the respective ring 5. Rings 5 perform a radial movement when port portion 10 moves in radial direction, and during such radial movements, rings 5 move in annular grooves 6 which are deeper than the radial extension of the rings 5.

The lateral radially extending annular faces of grooves 6 are slidingly and sealingly engage by the lateral annular faces 5a of the ring means 5. During lateral movement of the port member 10, rings 5 are guided by the annular lateral faces 3a of housing portions 3.

If fluid under pressure is at port 8, pressure is exerted on the confronting annular lateral faces of the respective rings 5 on opposite sides of port 8, and the respective two rings are pressed away from port 8 in opposite directions so that the remote annular faces 5a of the two rings abut the corresponding lateral annular faces 3a of the respective housing portions 3. In this manner, effective seals are provided on opposite sides of each port 8, or 9, and the rings 5 form a sealed chamber in each housing portion 3 for the respective port, while nevertheless permitting radial movement of the entire port portion 10 with rings 5, moving in recesses 6 in radial direction.

In the illustrated embodiment one of the sealing rings is used for sealing two chambers for the two ports 8 and 9.

In the bottom of each annular groove 6, an annular recess is provided in which another sealing ring 7 is located for sealing the abutting lateral faces of two housing portions 3.

It will be seen that each port is reliably sealed from the adjacent ports, while nevertheless a radial or other transverse movement of port portion 10 with rings 5 is possible.

It will be understood that each of the elements described above, or two or more together, may also find a useful application in other types of sealing arrangements for floating control bodies, differing from the type described above.

While the invention has been illustrated and described as embodied in a ring-sealing arrangement for a radially movable port member, it is not intended to be limited to the details shown, since various modifications and structural changes may be made without departing in any way from the spirit of the present invention.

What is new and desired to be protected by Letters Patent is set forth in the appended claims.

I claim:

1. Sealing arrangement for a radially movable port member, comprising a cylindrical port member having axially spaced ports and being mounted at least for radial movement within predetermined limits; housing means enveloping said port member and having an inner surface radially spaced from the outer surface of said cylindrical port member so that the same does not engage said inner surface during said limited radial movement, said inner surface having a plurality of annular grooves having a predetermined radial depth and being axially spaced and disposed so that each said port is located between two annular grooves, each groove being laterally bounded by a pair of radially extending lateral annular groove faces; and a ring means located in each annular groove carried by said port member and having an inner annular face in sealing contact with said outer surface of the same, and a pair of radially extending lateral annular ring faces in sliding and sealing engagement with at least one of said lateral annular groove faces of the respective annular groove, each ring means having an outer annular peripheral face spaced from the bottom of the respective annular groove so that said ring means radially move in said annular grooves, respectively, when radially moved by said port member while any two of said ring means between which any said port is located, form a sealed chamber in said housing for the respective port.

2. Sealing arrangement as claimed in claim 1 comprising means for mounting said port member for angular movement transverse to said axis so that said ring means move in radial direction in said annular grooves during said transverse angular movement.

3. Sealing arrangement as claimed in claim 1 wherein said port member has a plurality of peripheral annular faces respectively engaged by said inner annular faces of said ring means; and comprising a plurality of sealing rings surrounding said peripheral annular faces and located between the same and the inner annular face of the respective ring means.

4. Sealing arrangement as claimed in claim 3 wherein each of said peripheral annular faces of said port member is formed with an annular recess in which the respective sealing ring is located.

5. Sealing arrangement as claimed in claim 1 wherein said housing means include a plurality of laterally abutting annular housing portions; wherein said lateral groove faces of at least one of said annular grooves are provided by two laterally abutting housing portions; comprising a sealing ring located at the bottom of said annular groove between two laterally abutting annular housing portions.

6. Sealing arrangement as claimed in claim 5 wherein said bottom of said one annular groove has an annular recess in which said sealing ring is located.

7. Sealing arrangement as claimed in claim 1 wherein said port member has a plurality of axially spaced annular outer projections having peripheral annular faces respectively engaged by said inner annular faces of said ring means; wherein each of said peripheral annular faces is formed with an annular recess; and comprising a sealing ring located in each of said annular recess.

8. Sealing arrangement as claimed in claim 7 wherein said housing means include a plurality of laterally abutting annular housing portions; wherein said lateral groove faces of at least one of said annular grooves are provided by two laterally abutting housing portions; and comprising a sealing ring located at the bottom of said one annular groove between two laterally abutting annular housing portions.